Figure 2:
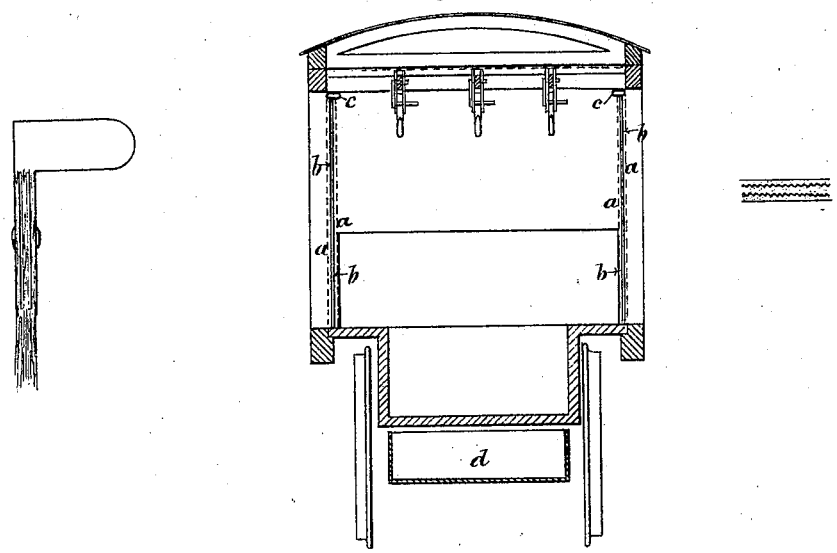

2 Sheets--Sheet 1.
J. E. ACKLOM.
Refrigerator Car.
No. 168,953.
Patented Oct. 19, 1875.
Fig: 1.
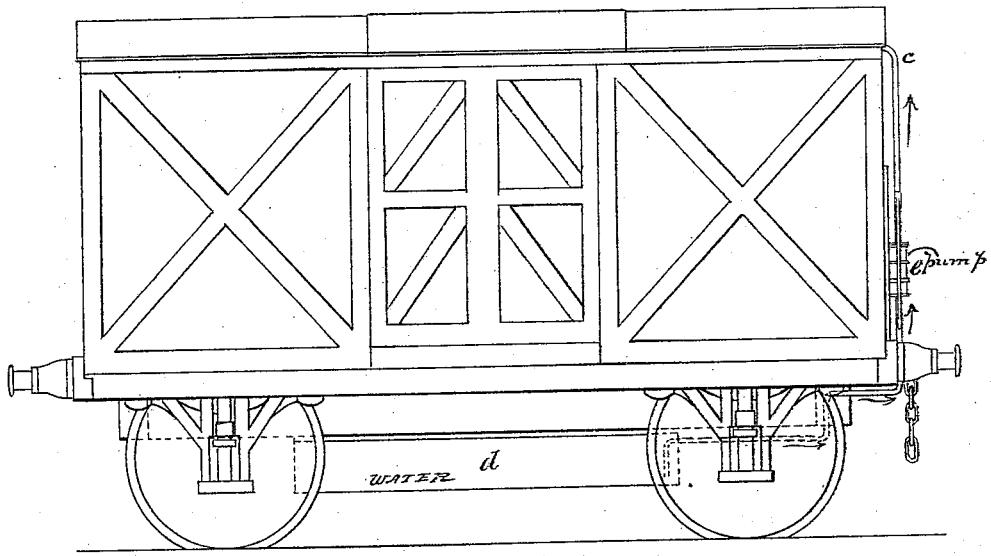
Fig: 3.
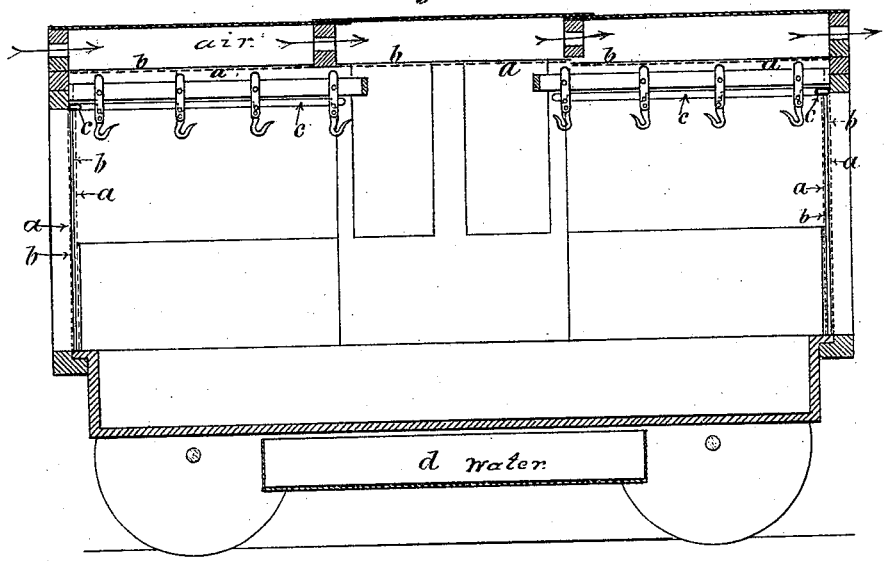
Witnesses:
Ele Davidson
Joseph S. Peyton
Inventor
John Evatt Acklom
by his Attorney
Wm D Baldwin
N. PETERS, PHOTO-LITHOGRAPHER, WASHINGTON, D. C.

2 Sheets--Sheet 2.

J. E. ACKLOM.
Refrigerator Car.

No. 168,953. Patented Oct. 19, 1875.

Witnesses:
E. C. Davidson
Joseph S. Peyton

Inventor:
John Evatt Acklom
by his attorney
Wm. D. Baldwin

UNITED STATES PATENT OFFICE.

JOHN EVATT ACKLOM, OF CHELTENHAM, ENGLAND.

IMPROVEMENT IN REFRIGERATOR-CARS.

Specification forming part of Letters Patent No. 168,953, dated October 19, 1875; application filed June 5, 1875.

*To all whom it may concern:*

Be it known that I, JOHN EVATT ACKLOM, of No. 1 Royal Well Terrace, Cheltenham, in the county of Gloucester, England, a subject of the Queen of Great Britain, have invented or discovered new and useful improvements in railway and other carriages for the conveyance of animal and vegetable substances used for food; and I, the said JOHN EVATT ACKLOM, do hereby declare the nature of the said invention, and in what manner the same is to be performed, to be particularly described and ascertained in and by the following statement thereof—that is to say:

This invention has for its object improvements in railway and other carriages for the conveyance of animal and vegetable substances used for food. For this purpose I inclose the body of the carriage all around the sides and ends with felt, supported by wire trellis-work.

I employ two or more thicknesses of felt, and the outer felt or felts are kept moist by water.

The roof or ceiling of the carriage may be similarly constructed.

Figure 1 is an elevation, Fig. 2 is a transverse section, and Fig. 3 a longitudinal section, of a railway-carriage for the conveyance of meat; but the same principle of construction is applicable to carriages for the conveyance of fruit and vegetables, or for the conveyance of beer and other perishable articles by road, rail, or sea.

Between inner and outer trellis or lattice work $a\ a$ (shown as composed of wire) are layers of felt $b\ b$, around the sides and ends of the carriage, the trellis-work and felts being secured in position to the framing or skeleton of the carriage-body in any suitable way. The outer layer or layers of felt are connected all around the carriage with a perforated water pipe or pipes, $c$. (Shown at or near the top of the sides and ends of the carriage.) The pipe is supplied with water, in this instance, by means of a water-tank, $d$, beneath the carriage, and a pump, $e$, and moistens the outer felt of the sides and ends, the inner felt remaining dry.

To afford access to the carriage in other manner than by the usual side doors, a section of the roof may be made movable, if desired; and a crane may be carried by the carriage, and used for loading and unloading.

An opening between the roof and carriage-body constitutes an air-passage over the felt and wire trellis-work, so that there may be a free circulation of air to carry off the sun's heat, and prevent it penetrating to the body of the carriage.

If preferred, the carriage may be provided with suitable hanging-bars and trip-hooks, upon which to suspend meat in such manner as to be readily disengaged from the hooks, to facilitate the unloading of the carriage when a crane is employed.

Obviously the trellis-work and felts may be protected by slats or bars secured to the framing or skeleton work of the carriage-body.

I claim as of my own invention—

1. The carriage-body constructed, substantially as hereinbefore set forth, with layers of felt secured between inner and outer trellis-work extending around its sides and ends.

2. The combination, substantially as hereinbefore set forth, with the frame of the carriage-body, of the inner and outer trellis-work, the layers of felt secured between the trellis-work and the perforated water-pipe to moisten the outer layer of felt.

3. The combination, substantially as hereinbefore set forth, of the carriage-body frame, the trellis-work, the layers of felt, the perforated water-pipe, the pump, and the water-tank.

4. The combination, as hereinbefore set forth, of the carriage-body surrounded by layers of felt, and the roof having an opening between it and the top of the body of the carriage, for the purpose specified.

J. E. ACKLOM,
       *Late Capt. 25th Reg.*

Witnesses:
 W. STOAKES,
  13 *Alsace Terrace, Southsea,*
   *Portsmouth, England, gentleman.*
 WM. P. POND,
  18 *St. Paul Square, Southsea,*
   *gentleman.*